(12) United States Patent
Collin

(10) Patent No.: US 12,310,271 B2
(45) Date of Patent: May 27, 2025

(54) GAUGE WHEEL DEVICE, ROW UNIT, AGRICULTURAL IMPLEMENT AND METHOD OF OPERATING GAUGE WHEEL DEVICE

(71) Applicant: Väderstad Holding AB, Väderstad (SE)

(72) Inventor: Morgan Collin, Mjölby (SE)

(73) Assignee: Väderstad Holding AB, Väderstad (SE)

( * ) Notice: Subject to any disclaimer, the term of this patent is extended or adjusted under 35 U.S.C. 154(b) by 712 days.

(21) Appl. No.: 17/623,809

(22) PCT Filed: Jul. 2, 2020

(86) PCT No.: PCT/SE2020/050701
§ 371 (c)(1),
(2) Date: Dec. 29, 2021

(87) PCT Pub. No.: WO2021/002799
PCT Pub. Date: Jan. 7, 2021

(65) Prior Publication Data
US 2022/0240429 A1 Aug. 4, 2022

(30) Foreign Application Priority Data
Jul. 4, 2019 (SE) .................................. 1950841-5

(51) Int. Cl.
*A01B 63/16* (2006.01)
*A01B 63/00* (2006.01)
(Continued)

(52) U.S. Cl.
CPC ............ *A01B 63/16* (2013.01); *A01B 63/008* (2013.01); *A01C 5/064* (2013.01)

(58) Field of Classification Search
CPC ..... A01B 23/046; A01B 63/16; A01B 63/166; A01B 63/008; A01B 71/02; A01C 5/064; A01C 7/203
See application file for complete search history.

(56) References Cited

U.S. PATENT DOCUMENTS 4,331,205 A * 5/1982 Sorenson ............... A01C 7/203
                                                   111/164
5,452,768 A    9/1995 Koberlein
(Continued)

FOREIGN PATENT DOCUMENTS

EP    1529431 A1    5/2005
FR    2415420 A1    8/1979
(Continued)

*Primary Examiner* — Adam J Behrens
*Assistant Examiner* — Robert E Pezzuto
(74) *Attorney, Agent, or Firm* — COATS & BENNETT, PLLC

(57) ABSTRACT

This document discloses a gauge wheel device (22) for maintaining working depth of a row unit (2) included in an agricultural implement, comprising a gauge wheel arm (220) which, at a distal portion thereof, carries a gauge wheel (221) which is rotatable about a gauge wheel shaft (2201, 220T). An effective length of the carrier arm (220) is variable. The document discloses a row unit comprising such a gauge wheel device, an agricultural implement comprising a plurality of such row units and a method for operating a gauge wheel assembly.

11 Claims, 3 Drawing Sheets

(51) Int. Cl.
*A01C 5/06* (2006.01)
*A01C 7/20* (2006.01)

(56) References Cited

U.S. PATENT DOCUMENTS

| | | | |
|---|---|---|---|
| 5,957,219 | A | 9/1999 | Friggstad |
| 6,325,156 | B1 | 12/2001 | Barry |
| 6,886,641 | B2 * | 5/2005 | Ronald ................. A01C 5/064 111/163 |
| 2010/0251947 | A1 * | 10/2010 | Mariman ................. B60C 7/26 152/379.3 |
| 2012/0006240 | A1 | 1/2012 | Henry |
| 2013/0118392 | A1 * | 5/2013 | Naylor ................. A01C 7/206 111/163 |
| 2014/0190374 | A1 | 7/2014 | Anderson et al. |
| 2014/0352991 | A1 | 12/2014 | Patwardhan et al. |
| 2019/0110388 | A1 | 4/2019 | Gresch et al. |

FOREIGN PATENT DOCUMENTS

| | | | |
|---|---|---|---|
| WO | 0215665 | A1 | 2/2002 |
| WO | 2008022373 | A1 | 2/2008 |
| WO | 2020112017 | A1 | 6/2020 |

* cited by examiner

GAUGE WHEEL DEVICE, ROW UNIT, AGRICULTURAL IMPLEMENT AND METHOD OF OPERATING GAUGE WHEEL DEVICE

TECHNICAL FIELD

This document relates to a gauge wheel device, a row unit comprising such a gauge wheel device, an agricultural implement comprising at least two, preferably 6-30, such row units, and a method for operating a gauge wheel device.

BACKGROUND

Through US2014190374A and US2019110388A, row units with seed furrow openers and gauge wheels are known.

Each seed furrow opener comprises a pair of seed discs which, in that their rotational axes are non-parallel, are placed in V-formation so that their peripheries meet at a single point of contact.

When sowing, the seed discs rotate and, thanks to the V-shape, form a seed furrow in which the seed is placed via a seed tube or a coulter.

One or more relatively wide gauge wheels are used to limit the working depth of the seed furrow opener. The gauge wheel comprises a gauge wheel arm, which is normally rotatable relative to a row unit frame, the gauge wheel being rotatably fixed to a distal portion of the gauge wheel arm. By changing the rotation position of the gauge wheel arm relative to the row unit frame, the working depth of the seed discs can be adjusted.

It is desirable to place the gauge wheel in the immediate vicinity of the opener. In both US2014190374A as US2019110388A, the gauge wheel is positioned to overlap the seed furrow opener sufficiently for the seed furrow opener's hub to be within the periphery of the gauge wheel.

In addition, it is desirable to place the gauge wheel in abutment against the seed furrow opener, so that the gauge wheel scrapes off soil that sticks to the seed furrow opener.

This, however, limits the relative movement possible between the seed furrow opener and the gauge wheel, and thus the range of different working depths possible for the row unit.

Thus, there is a need for a row unit with a greater range of working depth.

SUMMARY

It is thus an object to provide a gauge wheel device which facilitates the adjustment of different drilling depths, and which allows a greater range of working depth.

The invention is defined by the appended independent claims. Embodiments are apparent from the dependent claims, from the following description, and from the accompanying drawings.

According to a first aspect, a gauge wheel device is provided for maintaining the working depth of a row unit included in an agricultural implement, comprising a gauge wheel arm, which at a distal portion thereof supports a gauge wheel which is rotatable about a gauge wheel shaft. An effective length of the carrier arm is variable.

A "gauge wheel arm" is an arm that is pivotally attached to a row unit frame and which carries a gauge wheel. By "effective length" is meant the length from the geometric rotational axis of the gauge wheel shaft relative to a row unit to the geometric rotational axis of the gauge wheel.

By being able to adjust the length of the gauge wheel arm, it is possible to achieve a greater variation in planting depth even in a row unit where gauge wheel is placed so that it overlaps a seed furrow opener.

The gauge wheel shaft may be movable along the distal portion, between at least two positions spaced along the gauge wheel arm.

The positions can be fixed, predefined positions. Alternatively, the setting can be done wholly or partially continuously.

The gauge wheel device may further comprise a mounting member that extends along the gauge wheel arm, wherein the gauge wheel shaft is fixed at and extends perpendicular to the mounting member, and wherein the mounting member is mountable in at least two different positions relative to the gauge wheel arm.

The mounting member comprise a substantially planar and elongate part.

The mounting member may have a first fixing device at a first end thereof and a second fixing device at a second end thereof, the gauge wheel shaft being connected to the mounting member at a shorter distance from one fixing device than from the other.

Each of the fixing devices may comprise a fastener, such as a screw, a bolt or a pin.

The mounting member may be pivotally mounted to the gauge wheel arm around a pivot axis located between the gauge wheel shaft and one of the fixing devices.

The gauge wheel arm may comprise a slot extending along the gauge wheel arm, the shaft being displaceable in the slot.

The gauge wheel arm may have a profiled edge, which has a pair of axial recesses spaced apart in the longitudinal direction of the gauge wheel arm and a pivot axis tongue located therebetween.

The profiled edge may have at least one, preferably two, fixing tongues.

In a second aspect there is provided a row unit for an agricultural implement, comprising a row unit frame, a seed furrow opener supported by the row unit frame, and a gauge wheel device as described above, which is rotatable relative to the row unit frame.

By "supported" is meant that the seed furrow opener is supported directly by the row unit frame or by a seed furrow opener arm which is rotatable relative to the row unit.

The seed furrow opener may have at least one seed disc, wherein the gauge wheel overlaps the seed disc, such that a seed disc hub is radially inside a tread of the gauge wheel.

The gauge wheel may abut the seed disc.

Because the intermediate portion is perforated, it is possible to access the adjustable counter abutment through the gauge wheel, so that the axial position of the seed disc can be adjusted without the seed disc having to be removed and without having to remove the gauge wheel.

According to a third aspect, an agricultural implement is provided comprising at least two row units as described above.

The row units can be arranged side by side along an agricultural implement transverse beam. Preferably, the number of row units may be 5-30. The agricultural implement can be a drill, and in particular a precision seeder.

According to a fourth aspect, there is provided a method of operating a row unit of an agricultural implement, comprising changing an effective length of a gauge wheel arm carrying a gauge wheel.

The row unit may comprise a seed furrow opener and said gauge wheel may be arranged to overlap a seed disc such that a seed disc hub is radially inside a tread of the gauge wheel.

Said change can be effected by moving the position of a gauge wheel shaft along the longitudinal direction of the gauge wheel arm.

DETAILED DESCRIPTION

Figure 1:
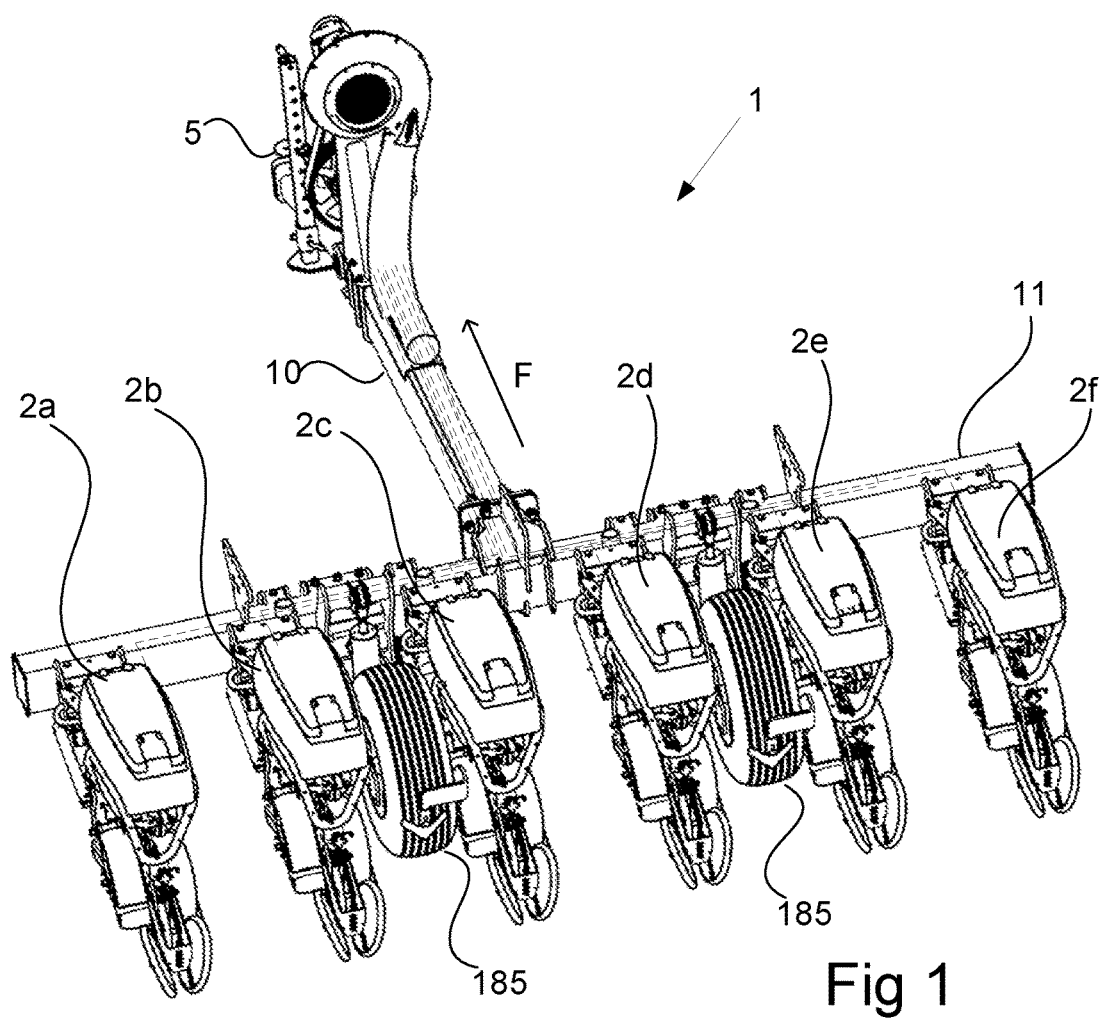
FIG. 1 is a schematic perspective view of a precision seed drill with six row units.

FIG. 1 shows a perspective view of an agricultural implement 1 in the form of a precision seed drill.

The agricultural implement 1 comprises a number, in this example six, output units 2a-2f, also called "row units", which are arranged side by side and connected to a transverse beam 11, which forms part of a frame supported by two wheels 185. The agricultural implement 1 is, by means of a connecting means 5 arranged at a free end of a longitudinal beam 10, arranged to be coupled to a traction vehicle such as a tractor and intended to be driven in a forward direction indicated by the arrow F.

Each of the output units 2a-2f has a planting device, which is arranged to form a seed furrow in the driving direction of the agricultural implement 1, when the agricultural implement 1 moves over the soil to be sown, to feed material, in this case the seed, and possibly also fertilizer and/or pesticide, to the seed furrow, after which it is closed. In the example shown, each output unit 2a-2f has its own drive device (not shown), which may include an electric motor as well as a local controller, which controls the drive device and acts as an interface to a central controller.

The output devices 2a-2f may be movably secured to the agricultural implement frame 10, 11. For example, the output devices 2a-2f may be secured via a parallel linkage which may be spring loaded and/or adjustable by means of an actuator, such as a hydraulic actuator.

Thus, in the example shown, the seed drill is a so-called precision seed drill, i.e. a seed drill that singles the granules, such as seeds, to be distributed, and places them one by one at a certain distance in the forward direction.

It will be appreciated that the invention can also be applied to other types of drills, such as volumetric drills, and especially to drills where the row units can be controlled individually or in groups with respect to the output amount of material per unit length.

In addition, the invention can be applied to machines for distributing pesticides and/or fertilizers, in solid or liquid form, provided also that dispensing nozzles are individually or in groups controllable.

Figure 2:
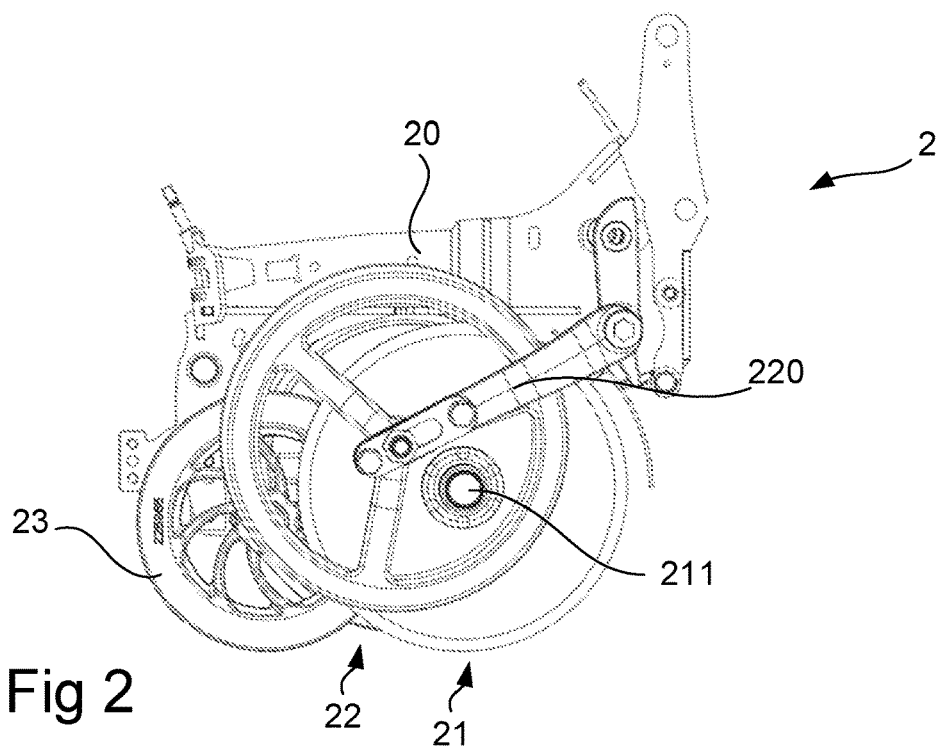
FIG. 2 shows a schematic side view of a part of a row unit.

FIG. 2 shows a side view of a row unit 2 that can be used in the agricultural implement shown in FIG. 1, as well as in other precision or volumetric seeding drills.

The row unit comprises a row unit frame 20 which is attached to a transverse beam of the agricultural implement via an attachment device, which may comprise a parallel link arrangement.

The row unit 2 comprises a seed furrow opener 21, the purpose of which is to form a seed furrow in the soil, extending along the forward direction F of the agricultural implement.

The row unit 2 may further comprise a carrier device 22, the purpose of which is to control a working depth for the seed furrow opener 21.

The row unit 2 may further comprise a pressure wheel 23, the purpose of which is to catch and/or press the feed material, to ensure correct placement in the seed furrow.

In addition, the row unit 2 may comprise a seed furrow closer (not shown), a feeding device which may comprise a singulator (not shown) and a container for the material to be fed.

The carrier 22 comprises at least one, usually two, gauge wheel arms 220, which support respective gauge wheels 221. The gauge wheel arms and gauge wheels may be mirrored relative to a vertical plane containing the forward travel direction F.

The gauge wheel arm 220 can be adjustably rotatable relative to the row unit frame 20 around a gauge wheel arm joint 225. By adjusting the angle of the gauge wheel arm relative to the row unit frame 20, the working depth of the seed furrow opener is adjusted.

Each gauge wheel 221 may have a gauge wheel hub 222, a tread 223 and an intermediate portion 224 which extends radially between the gauge wheel hub and the tread. The intermediate portion may be solid or perforated, for example by being made up of one or more spokes.

In the example shown, the intermediate portion 224 is perforated, which can be accomplished by providing the intermediate portion with one or more holes, or by forming the intermediate portion by one or more spokes.

As can be seen from FIG. 2, the gauge wheels 221 are arranged so that, viewed from the side, they partially overlap the seed discs 216. Specifically, they overlap the seed discs to such an extent that the respective seed disc hub unit 211 is located radially within the periphery of the respective gauge wheel.

Figure 3A:
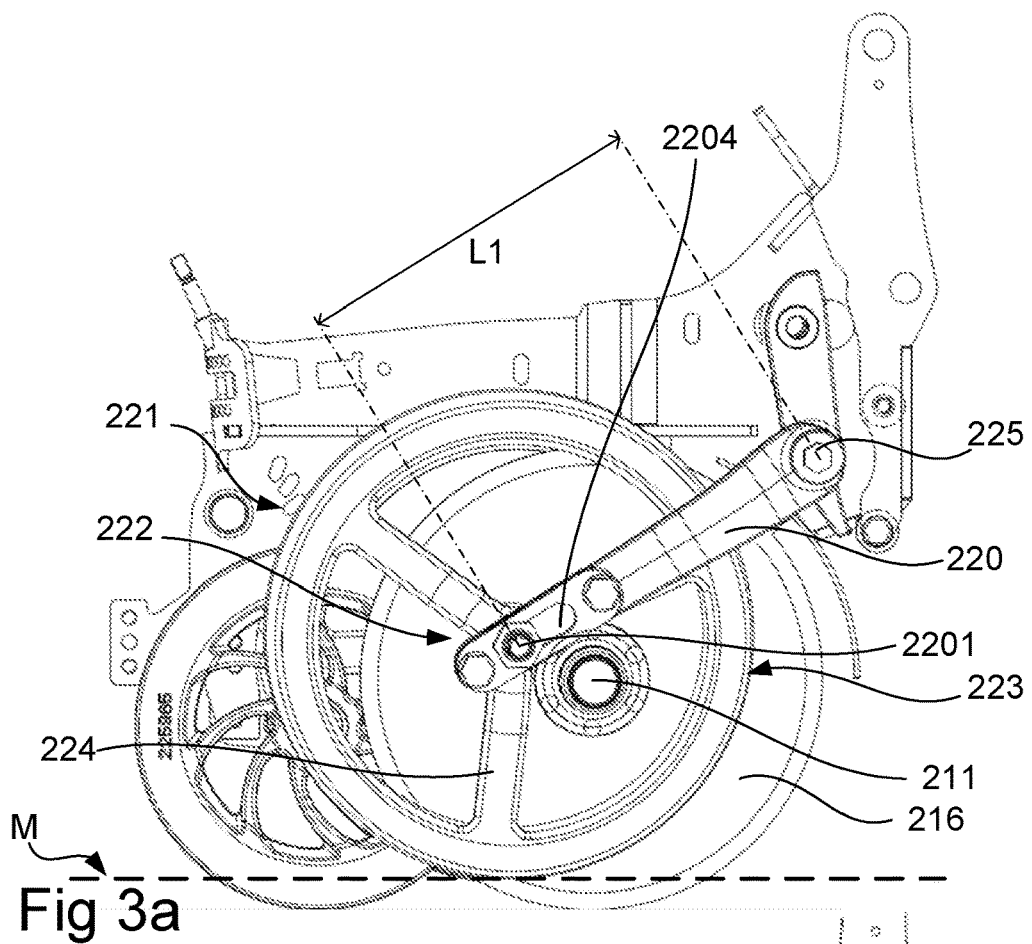
FIGS. 3a-3b show a schematic side view of a first embodiment of the row unit in shallow and deep seeding conditions respectively.
Figure 3B:
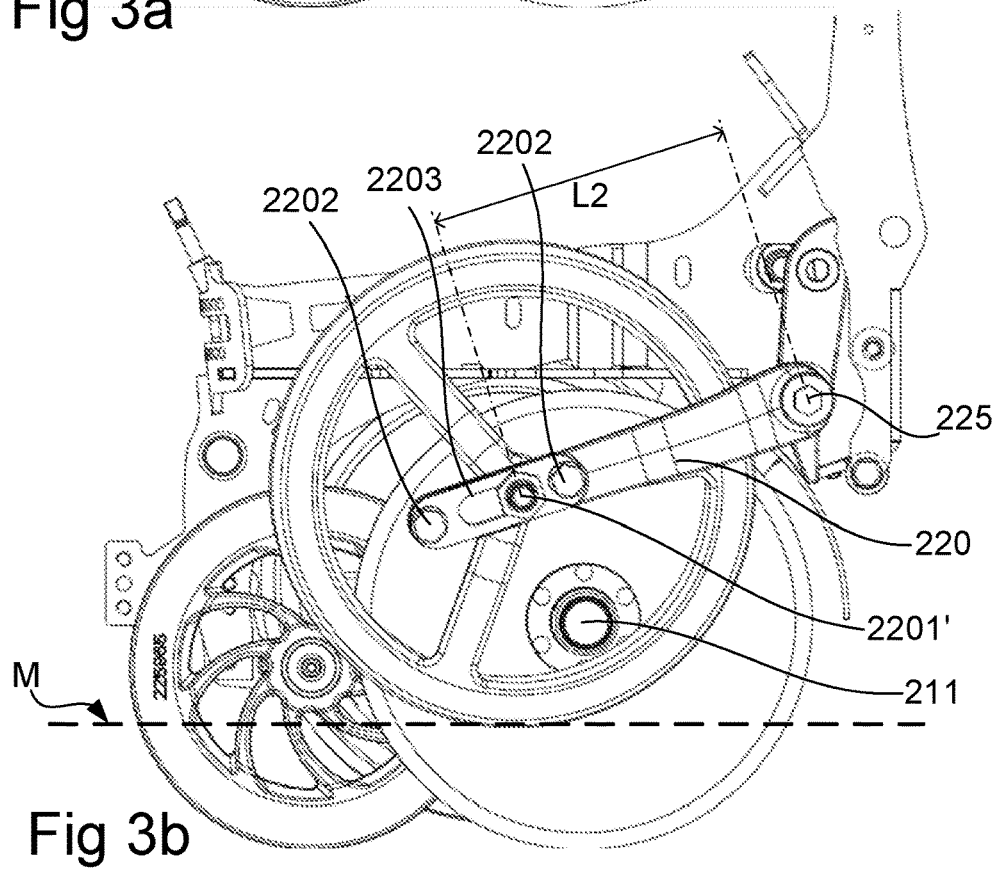
Figure 4A:
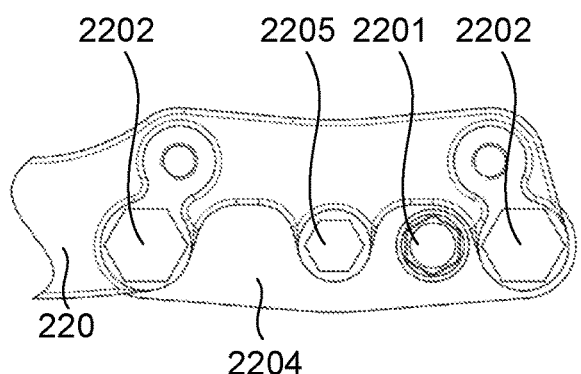
FIGS. 4a-4b show a schematic side view of a distal portion of a gauge wheel arm according to a second embodiment of the row unit, in the condition for shallow seeding and for deep seeding respectively.
Figure 4B:
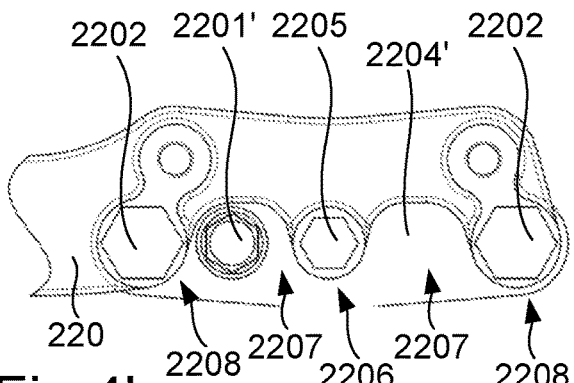
Figure 5A:
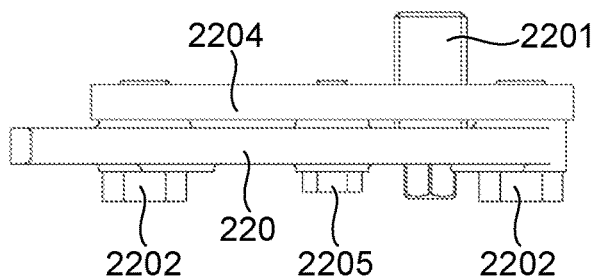
FIGS. 5a-5b show a schematic top view of the distal portion of the carrier arm according to the second embodiment of the row unit, in the condition for shallow seeding and for deep seeding respectively.
Figure 5B:
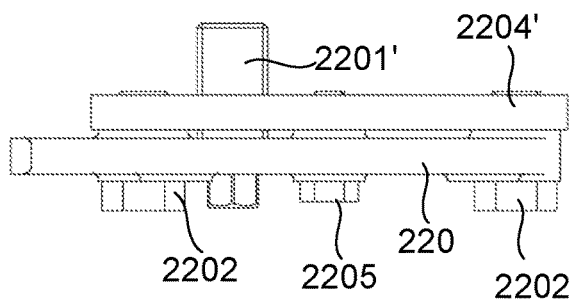
Figure 6A:
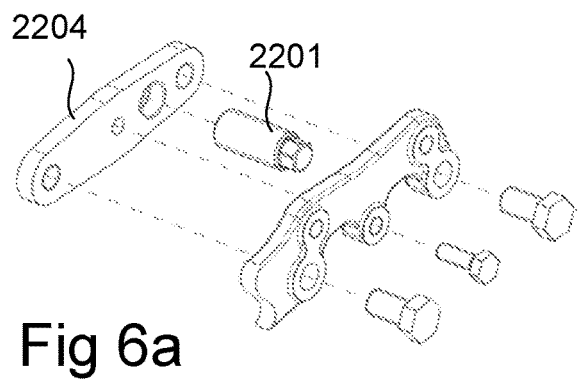
FIGS. 6a-6b show a schematic exploded view in perspective view of the distal portion of the carrier arm according to the second embodiment of the row unit, in condition for shallow seeding and for deep seeding respectively.
Figure 6B:
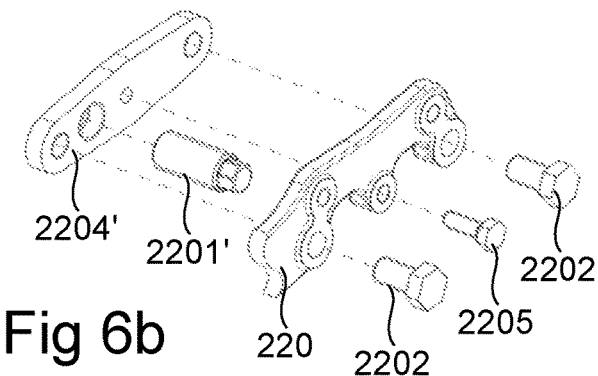
Figure 7A:
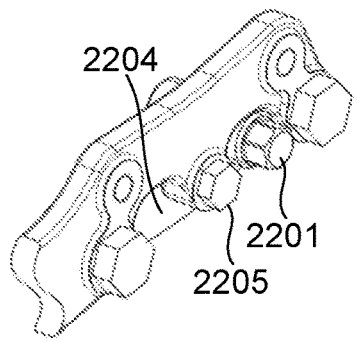
FIGS. 7a-7b show a schematic perspective view of the distal portion of the carrier arm according to the second embodiment of the row unit, in the condition for shallow seeding and for deep seeding respectively.
Figure 7B:
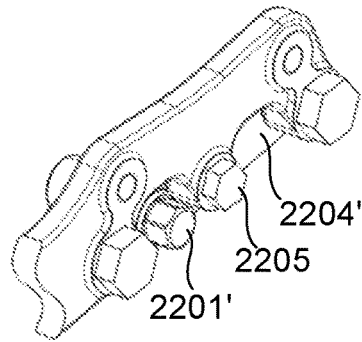

Referring to FIGS. 3a and 3b, an embodiment is shown in which a gauge wheel shaft 2201 is movable between two positions, so that the effective length of the gauge wheel arm can be varied between a long length L1 for shallow drilling and a short length L2 for deep drilling. The gauge wheel hub 211 can be mounted on the gauge wheel shaft 2201. Ground level is indicated by reference numeral M.

In the embodiment shown in FIGS. 3a and 3b, the carrier shaft is mounted on an elongated plate 2204, the contour of which can coincide with the contour of the distal portion of the gauge wheel arm. At the ends of the plate 2204 there are mounting holes for fasteners 2202. The gauge wheel shaft 2201 is mounted closer to one end of the plate than the other.

The gauge wheel arm 220 has a slot 2203 in which the gauge wheel shaft 2201 is insertable.

The position of the gauge wheel shaft 2201 is selected by selecting the orientation of the plate 2204 so that the shaft lands in the desired position, after which the fasteners 2202 are mounted to fix the plate 2204 in the desired position.

When changing the position of the gauge wheel shaft 2201, the fasteners 2202 are loosened, the plate 2204 being rotated 180 degrees around the carrier shaft and adjusted along the gauge wheel arm 220 in the slot 2203 until the holes in the plate 2204 coincide with the corresponding holes in the gauge wheel arm 220, whereby the fasteners 2202 are mounted in the holes.

Referring to FIGS. 4a-4b, 5a-5b, 6a-6b and 7a-7b, a second embodiment of an attachment for the shaft 2201, 2201' is shown.

In FIGS. 4a, 5a, 6a and 7a, the attachment is shown in the position which gives the longest possible effective gauge wheel arm length, i.e. the position for shallow seeding, similar to that shown in FIG. 3a.

In FIGS. 4b, 5b, 6b and 7b, the attachment is shown in the position that gives the shortest possible effective gauge wheel arm length, i.e. the position for deep seeding, similar to that shown in FIG. 3b.

FIGS. 4a-4b, 5a-5b, 6a-6b and 7a-7b show a mounting plate 2204, 2204' which is pivotally attached to the distal portion of the gauge wheel arm 220.

The distal portion of the gauge wheel arm 220 has a profiled edge portion, which comprises a pivot axis tongue 2206, shaft recesses 2207, 2207' on either side of the pivot axis tongue, as seen in the longitudinal direction of the gauge wheel arm 220, and mounting tongues 2208 for the fasteners 2202. Each of the tongues 2208, 2206, 2207, 2207' has an associated hole for receiving fasteners 2202 and shaft 2201, 2205, respectively.

The mounting plate 2204, 2204' is rotatable about a rotary shaft 2205, which is mounted in holes in the pivot axis tongue 2206, between two positions, which are limited by the interaction between the shaft 2201 and the shaft recesses 2207, 2207'.

As shown in FIGS. 4a, 5a, 6a, 7a, the shaft 2201, in the position of long effective gauge wheel arm length, is received in the proximal shaft recess 2107, which is visible to the left in the figures.

As shown in FIGS. 4b, 5b, 6b, 7b, the shaft 2201', in the position of short effective gauge wheel arm length, is received in the distal shaft recess 2207', which is visible to the right in the figures.

The shift between the positions of the shaft 2201, 2201' is as follows. The fasteners 2202 are loosened so that the plate 2204, 2204' becomes rotatable about the shaft 2205. Thereafter, the plate 2204, 2204' is rotated about the shaft 2205 approximately 180 degrees to the second position, so that the shaft 2201' is received in the second shaft recess 2207', after which the fasteners 2202 mounted back.

The invention claimed is:

1. A gauge wheel device for maintaining working depth of a row unit included in an agricultural implement, comprising:
a gauge wheel arm which, at a distal portion thereof, carries a gauge wheel which is rotatable about a gauge wheel shaft,
a mounting member that extends along the gauge wheel arm, wherein the gauge wheel shaft is fixed at and extends perpendicular to the mounting member, and
wherein the mounting member is mountable in at least two different positions relative to the gauge wheel arm,
wherein the mounting member forms a substantially flat and elongated part, and
wherein the mounting member has a first fixing device at a first end thereof and a second fixing device at a second end thereof, wherein the gauge wheel shaft is connected to the mounting member at a shorter distance from one of said fixing devices than from the other, such that an effective length of the gauge wheel arm is variable; and
wherein the mounting member is pivotally mounted to the gauge wheel arm around a pivot axis located between the gauge wheel shaft and one of the fixing devices.

2. The gauge wheel device according to claim 1, wherein each of the fixing devices comprises a fastener.

3. The gauge wheel device according to claim 1, wherein the gauge wheel arm comprises a slot extending along the gauge wheel arm, wherein the shaft is displaceable in the slot.

4. The gauge wheel device according to claim 1, wherein the gauge wheel arm has a profiled edge, which has a pair of axial recesses spaced apart in the longitudinal direction of the gauge wheel arm and a pivot axis tongue located therebetween.

5. The gauge wheel device according to claim 4, wherein the profiled edge has at least one fixing tongue.

6. The gauge wheel device according to claim 4, wherein the profiled edge has two fixing tongues.

7. A row unit for an agricultural implement, comprising:
a row unit frame,
a seed furrow opener supported by the row unit frame, and
a gauge wheel device according to claim 1, which is rotatable relative to the row unit frame.

8. The row unit according to claim 7, wherein the seed furrow opener has at least one seed disc, wherein the gauge wheel overlaps the seed disc, so that a seed disc hub is radially inside a tread of the gauge wheel.

9. The row unit according to claim 8, wherein the gauge wheel abuts the seed disc.

10. An agricultural implement comprising at least two row units according to claim 7.

11. The gauge wheel device of claim 2 wherein said fastener is taken from the group including a screw, bolt or pin.

* * * * *